US012393020B2

(12) United States Patent
Finnegan

(10) Patent No.: US 12,393,020 B2
(45) Date of Patent: Aug. 19, 2025

(54) SENSOR HEAD FOR CLEANING THE SURFACE OF ONE OR MORE SENSORS

(71) Applicant: LVLOGICS LTD., Kells (IE)

(72) Inventor: Barry Finnegan, Kells (IE)

(73) Assignee: LVLOGICS LTD., Kells (IE)

( * ) Notice: Subject to any disclaimer, the term of this patent is extended or adjusted under 35 U.S.C. 154(b) by 969 days.

(21) Appl. No.: 17/605,653

(22) PCT Filed: Apr. 23, 2020

(86) PCT No.: PCT/EP2020/061393
§ 371 (c)(1),
(2) Date: Oct. 22, 2021

(87) PCT Pub. No.: WO2020/216868
PCT Pub. Date: Oct. 29, 2020

(65) Prior Publication Data
US 2022/0219649 A1 Jul. 14, 2022

(30) Foreign Application Priority Data
Apr. 23, 2019 (EP) ..................................... 19170706

(51) Int. Cl.
*G02B 27/00* (2006.01)
*G02B 27/10* (2006.01)
(Continued)

(52) U.S. Cl.
CPC ..... *G02B 27/0006* (2013.01); *G02B 27/1013* (2013.01); *B60S 1/46* (2013.01); *B60S 1/54* (2013.01); *B60S 1/56* (2013.01)

(58) Field of Classification Search
None
See application file for complete search history.

(56) References Cited

U.S. PATENT DOCUMENTS 10,144,394 B1 12/2018 Rice
2011/0073142 A1 3/2011 Hattori et al.
(Continued)

FOREIGN PATENT DOCUMENTS

| AU | 2008207462 A1 | 1/2010 |
| DE | 102010022163 A1 | 11/2011 |
| WO | 2002/072274 A1 | 9/2002 |

OTHER PUBLICATIONS

International Search Report and Written Opinion dated Jul. 16, 2020 which was issued in connection with PCT/EP2020/061393.
(Continued)

*Primary Examiner* — Dung T Nguyen
(74) *Attorney, Agent, or Firm* — Buckley, Maschoff & Talwalkar LLC

(57) ABSTRACT

A sensor head configured for facilitating cleaning a surface of one or more sensors, the sensor head comprising a shell defining a surround for accommodating the one or more sensors therein. Said shell further comprises at least one conduit for receiving a volume of a fluid to facilitate the cleaning of the surface of one or more sensors. The conduit is operably connected to a pressure vessel having a pressure release valve configured to be openable when the pressure in the pressure vessel reaches a predefined value, to facilitate the flow of fluid to the conduit at a desired release pressure.

15 Claims, 9 Drawing Sheets

(51) Int. Cl.
    *B60S 1/46*         (2006.01)
    *B60S 1/54*         (2006.01)
    *B60S 1/56*         (2006.01)

(56) References Cited

U.S. PATENT DOCUMENTS

| | | | |
|---|---|---|---|
| 2013/0293881 A1* | 11/2013 | Tokhtuev | G02B 27/0006 |
| | | | 250/438 |
| 2015/0138357 A1 | 5/2015 | Romack et al. | |
| 2018/0170319 A1 | 6/2018 | Schmidt | |

OTHER PUBLICATIONS

European Search Report and Written Opinion dated Oct. 4, 2019 which was issued in connection with EP19170706.6.

\* cited by examiner

SENSOR HEAD FOR CLEANING THE SURFACE OF ONE OR MORE SENSORS

FIELD OF THE INVENTION

This invention relates to an apparatus and a system for facilitating cleaning of the surface of one or more sensors, and in particular but not exclusively to a device configured to induce a pressure differential in the flow of a fluid to the surface of the one or more sensors.

BACKGROUND OF THE INVENTION

The storage of bulk materials in large quantities is commonplace in industry, allowing one to efficiently monitor and store said materials for long periods of time away from the elements, thereby increasing their lifetime. Industries in which this practice is particularly prominent include agriculture where grain and silage are stored, and the storage of materials used in construction such as cement and aggregate. To monitor material quality and storage conditions, sensors of various kinds are often used.

In silo storage, the stored material may be selectively unloaded over a long period of time—albeit from an opaque volume not practically accessible to humans, making it difficult to track the level of the material in the silo. As such, methods and systems for taking measurements inside silos are considered highly desirable and have been widely developed. However, the environments in which bulk materials such as grain, ash, flour and cement are stored are often characterised by large quantities of dust in the air. Consequently a significant obstacle to the acquisition of accurate sensor data in such environments is the accumulation of particulate matter on surfaces of the sensors, which can diminish the transmission of light to the sensor or hinder their operation in other ways. A similar challenge is found in the realm of motor vehicular sensors, where the use of sensors on vehicles such as LIDAR-based proximity sensors and reversing cameras is becoming more commonplace.

It is therefore desirable to provide an apparatus and system which solves at least some of the problems described above

SUMMARY OF THE INVENTION

According to a first aspect of the present disclosure there is provided a sensor head configured for facilitating cleaning a surface of one or more sensors, the sensor head comprising:
  a shell defining a surround for accommodating the one or more sensors therein, said shell further comprising:
  at least one conduit for receiving a volume of a fluid to facilitate the cleaning of the surface of one or more sensors, said at least one conduit in communication with at least one volume,
  at least one channel in communication with the at least one volume, said at least one channel configured for directing the flow of fluid to a vicinity of the surround; and
  a plurality of orifices formed on the surround which are in communication with the channels, for facilitating the distribution of the fluid from the channels to the surface of one or more sensors; wherein the cross-sectional area of the at least one channel is different than the cross-sectional area of the at least one volume to control the pressure of the fluid directed to the orifices.

Preferably the cross-sectional area of the at least one channel is less than the cross-sectional area of the at least one volume to increase the pressure of the fluid directed to the orifices.

Advantageously, the sensor head further comprises an oscillation mechanism connected to the shell, for actuating oscillating motion of the sensor head.

Optionally the oscillation mechanism may be configured to have an adjustable frequency.

Advantageously the position and number of the orifices are chosen to facilitate the generation of a vortex on the surface of the one or more sensors.

Advantageously the perimeter of the surround defined by the shell can be bevelled.

Further advantageously the sensor head may comprise a pivot mechanism positioned diametrically opposite the one or more sensors to facilitate reorientation of the sensor head.

The pivot mechanism may be positioned diametrically opposite the one or more sensors to facilitate reorientation of the sensor head. The pivot mechanism may comprise a ball joint.

According to a second aspect of the present disclosure there is provided a controller for use with the sensor head described above, comprising one or more processors operationally associated with one or both of the one or more sensors and a fluid supply; and one or more memory units.

Advantageously, at least one of the one or more sensors is configured for detecting when a predefined threshold fraction of a measured signal intensity has been surpassed.

Preferably at least one of the one or more sensors is configured to transmit a signal when it has detected that a predefined threshold fraction of a measured signal intensity has been surpassed.

Advantageously, the one or more processors may be configured for receiving the signal generated by the one or more sensors in response to a predefined threshold fraction of a measured signal intensity having been surpassed.

Further advantageously, the one or more processors may be configured to control the fluid supply to initiate the flow of fluid to the at least one conduit in response to the signal received from the one or more sensors when a predefined threshold fraction of a measured signal intensity has been surpassed.

Advantageously, the one or more processors may be further configured to transmit a signal to the oscillation mechanism to initiate oscillating motion of the sensor head in response to the signal received from the one or more sensors when a predefined threshold fraction of a measured signal intensity has been surpassed.

Advantageously, the one or more processors being further operationally associated with a remote control system.

Advantageously, the remote control system may be configured to selectively control the fluid supply to initiate the flow of fluid from the fluid supply to the at least one conduit, in response to a user input.

Further advantageously, the one or more processors may be configured to transmit information to the remote control system including but not limited to one or more intensity profiles measured by the one or more sensors and a notification when a predefined threshold fraction of a measured signal intensity has been surpassed.

Advantageously, the remote control system comprises a user display interface for displaying information including but not limited to the one or more intensity profiles measured by the one or more sensors and a notification when a predefined threshold fraction of a measured signal intensity has been surpassed.

DETAILED DESCRIPTION OF THE DRAWINGS

The present teaching will now be described with reference to an exemplary sensor head configured for facilitating cleaning a surface of one or more sensors. It will be understood that the exemplary sensor head is provided to assist in an understanding of the present teaching and are not to be construed as limiting in any fashion. For example, the exemplary sensor head of the present disclosure may be installed in various types of storage facilities or any appropriate volume—the application of the exemplary sensor head is not envisaged by the inventor to be confined to use in silos. Furthermore, elements or components that are described with reference to any one Figure may be interchanged with those of other FIGS. or other equivalent elements without departing from the spirit of the present teaching.

Figure 1:
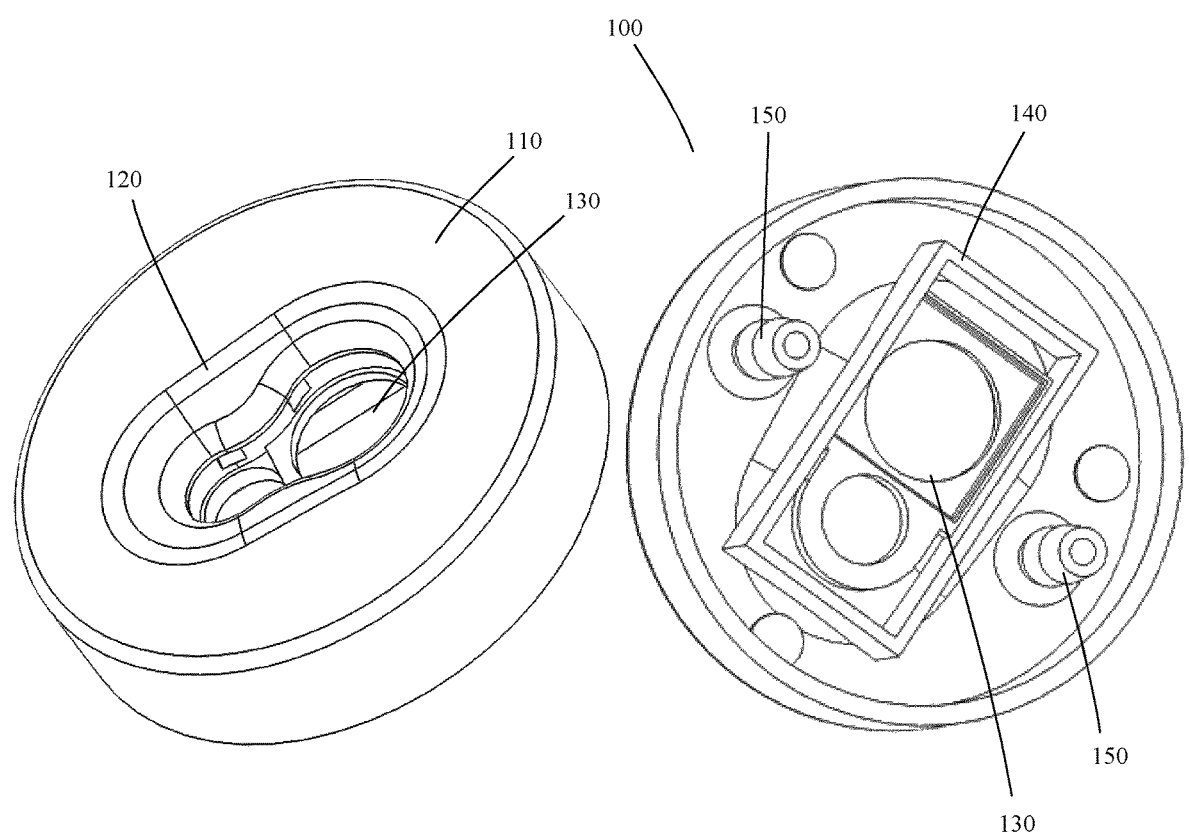
FIG. 1 is an illustration of isometric views of a sensor head, according to an embodiment of the present disclosure.

Referring now to the Figures there is illustrated an exemplary sensor head configured for facilitating cleaning a surface of one or more sensors by the direction of a fluid from a fluid supply on to the surface(s) of the sensor(s). FIG. 1 illustrates isometric views of the top and underneath of a sensor head 100 comprising a shell 110 which defines a surround 120 for accommodating the one or more sensors therein. In the exemplary embodiment, the sensor head 100 may be mounted on a sensor system which comprises the one or more sensors. The sensor system is presented in FIGS. 6a and 6b. It will be understood that the sensor system may be any industry-standard system which includes sensor (s) mounted on, for example, an elongated portion which accommodates relevant circuitry of the sensor(s) and which has disposed at one end a mounting means for mounting the sensor system to a surface such as a ceiling or a wall. The surround 120 may further comprise one or more apertures 130 through which the one or more sensors may "sense". In the exemplary embodiment, the surround 120 extends underneath the shell 110 to form a fitting portion 140 which may facilitate fitting of the sensor head 100 around at least a portion of the neck of the sensor system. In the embodiment of FIG. 1, the fitting portion 140 is dimensioned to form a rectangular shape, however it will be understood that the fitting portion 140 can be dimensioned to form other shapes such as but not limited to a circular shape, an elliptical shape or a triangular shape. This flexibility in the choice of dimensions of the fitting portion 140 provides freedom to design the sensor head 100 to be retro-fitted to a number of different pre-existing sensor systems. Moreover, flexibility in the choice of dimensions of the other portions of the sensor head 100 are envisaged by the inventor as being feasible in light of the same or other considerations.

In the exemplary embodiment, the shell 110 may comprise at least one conduit 150 for receiving a volume of the fluid to be directed to the surface of the one or more sensors. The conduit(s) 150 may be connected via suitably configured pipework to the fluid supply (not shown), and may be dimensioned to form a tubular formation or other desired shapes. The conduit(s) 150 may be disposed on the underneath of the shell 110, as in the embodiment of FIG. 1. Alternatively, the conduit(s) may be disposed on the sides and/or the top of the shell 110. In the exemplary embodiment, the at least one conduit 150 may be in communication with at least one volume best presented in FIGS. 3 and 4. In exemplary embodiment, there may be two volumes diametrically opposite each other. The at least one volume may be configured to receive the fluid from the conduit 150 it is in communication with. Moreover, at least one channel may be in communication with the at least one volume. The at least one channel may be configured for directing the flow of fluid to a vicinity of the surround 120. Advantageously, a plurality of orifices may be formed on the surround 120. The orifices may be in communication with the channels, thereby facilitating the distribution of the fluid from the channels to the surface of one or more sensors. The channel(s) and the orifice(s) are best presented in FIGS. 3-5.

In one embodiment, the cross-sectional area of the at least one channel may be less than the cross-sectional area of the at least one volume to increase the pressure of the fluid directed to the orifices. That is, one can provide a jet stream to the surface of the one or more sensors at a pressure $P_1 > P_2$, where $P_2$ is the pressure of the fluid in the at least one volume. A volume of liquid travelling in a first cylinder of cross-sectional area $A_1$ and occupying a length $d_1$ of the first cylinder defines a volume flow rate $Q_1$ of, $$Q_1 = \frac{V_1}{t} = \frac{A_1 \times d_1}{t} = A_1 v_1$$

where $v_1$ is the velocity of the liquid in the first cylinder. Equivalently, the same liquid travelling in a second cylinder of cross-sectional area $A_2$ and occupying a length of the second cylinder $d_2$ defines a volume flow rate of, $$Q_2 = \frac{V_2}{t} = \frac{A_2 \times d_2}{t} = A_2 v_2$$

where $v_2$ is the velocity of the liquid in the second cylinder. It is understood from the fluid mechanical principle of the conservation of flow rates that $$Q_1 = Q_2$$

and therefore:

$$v_2 = \frac{A_1 v_1}{A_2}$$

In view of the above, it will be understood by the skilled that if you decrease the cross-sectional area $A_2$ of the second cylinder whilst keeping $A_1$ constant, the velocity $v_2$ of the liquid will increase. This will manifest as an increase in the pressure of the liquid reaching the surface of the one or more sensors via the channels, when compared with its pressure in the volumes. It will be understood by the skilled person that this example was by way of approximation and for demonstrative purposes only. A similar treatment may be presented in relation to a number of other geometries and it will be understood that the presentation of a physical model involving a liquid in a cylinder is not intended to be limiting the scope of the present invention in any way, shape or form and merely serves to lend intuition to the pressure-enhancement aspect of the present invention.

A similar treatment may be applied to a gas travelling between two cylindrical volumes, albeit without the relation $Q_1 = Q_2$ holding as will be understood by the skilled person. In embodiments where the fluid is a gas, Boyle's law has for a gas at constant initial pressure $P_1$:

$$P_2 \propto \frac{V_1}{V_2}$$

That is, if one forces the gas molecules in to a smaller volume $V_2$ with respect to a volume $V_1$ which the gas initially occupied, the pressure $P_2 < P_1$. It will be understood that if one decreases the cross-sectional area of the second cylinder with respect to the first cylinder, one finds that the pressure $P_2$ of the gas travelling in the second cylinder has increased with respect to its pressure $P_1$ when travelling in the first cylinder. It will again be understood by the skilled person that this example was by way of approximation and for demonstrative purposes only, to lend intuition to the pressure-enhancement aspect of the present invention. Moreover, the above use of the ideal gas law in Boyle's law will be understood by the skilled person to be relevant in as much as that the compressibility factor of a gas is commonly approximated to unity. This is particularly true in the present application, where the fluid is preferably selected to not approach any change of state at the typical thermodynamic parameters associated with the environment and the operation of the present invention. However, it is envisaged by the inventor that materials and components which form the sensor head 100 and the sensor system may be selected to withstand a wide variety of ambient thermodynamic parameters and the fluid may be selected accordingly—in such embodiments, the compressibility factor may be factored in to any physical model of the pressure-enhancement aspect of the present invention if a change of state is a feasible occurrence. Preferably the materials which form the sensor head 100 are capable of withstanding and maintaining functionality in a temperature range of $-30°$ C. $\leq T \leq 60°$ C. and 0-100% humidity.

A significant advantage of this pressure-increasing configuration is that one can provide a high-pressure jet stream of the fluid to the surface of the one or more sensors without the need for a high-pressured fluid supply. This might, for example, reduce costs relating to the purchase of pressurised fluids—the various treatment and storage processes of a fluid such as a natural gas contributes significantly to their market price.

In an alternative embodiment, the cross-sectional area of the at least one channel may be greater than the cross-sectional area of the at least one volume to decrease the pressure of the fluid directed to the orifices.

In some embodiments, the sensor system includes a laser of a desired wavelength and a sensor configured for measuring the intensity of the laser light reflected from the surfaces of the volume in which the sensor system is positioned. Alternatively, a source emitting ultrasonic sound waves may be implemented together with an appropriately configured sensor. It will be understood that a number of other emitting sources are feasible, the fundamental principle of the emitter/sensor configuration being to emit a signal and for a sensor to measure the signal intensity reflected from the surfaces of the environment and returned to said sensor. The emitting source may be positioned adjacent to the sensor(s) of the sensor system and as such the surround 120 may be appropriately dimensioned to accommodate the emitting source. In one embodiment, an aperture of the surround 120 may be appropriately dimensioned to accommodate the emitting source. In the exemplary embodiment, the volume in which the sensor system is positioned is a silo. The cooperation of the emitting source and the sensor(s) may serve to actuate the cleaning of the surface of the one or more sensors by way of the sensor(s) detecting when the measured signal intensity reflected back to the sensor(s) has dropped below a predefined threshold fraction possibly due to an accumulation of particulate matter or other debris on the surface(s) of the sensor(s). Generally, the predefined threshold fraction may be a minimum reflected signal intensity. Preferably, the predefined threshold fraction may be a minimum reflected laser light intensity. In the exemplary embodiment, a controller may be implemented in conjunction with the sensor head, for communicatively coupling the sensor(s) and the fluid supply. The controller may comprise one or more processors operationally associated with one or both of the one or more sensors and the fluid supply; and one or more memory units. The controller and embodiments of the cleaning process are best presented in relation to FIG. 8. An 'in-use' discussion is presented subsequent to FIG. 8.

In the exemplary embodiment, the perimeter of the surround 120 defined by the shell 110 may be bevelled. An advantageous aspect of configurations in which the surround 120 is bevelled is that particulate matter being blown off of the surface of the sensor(s) is more likely to be displaced away from the sensor(s) altogether if, having been displaced from the surface of the one or more sensors, the particulate matter is not met with an entirely upright wall which would likely act as a barrier to motion of particulate matter away from the sensor(s). A further advantageous aspect of the bevelled form of the surround 120 pertains to embodiments in which an emitting source of the sensor system emits and a signal and in which reflected signal intensity is measured by the sensor(s). The bevelled formation acts to define a larger cross-sectional area for receiving reflected light or sound and reflecting it to the sensor(s), and consequently increases the reflected signal intensity detected by the sensor(s). The bevelled formation may also broaden the beam angle of the emitted signal. Thus, the bevelled form of the surround 120 solves a multiplicity of problems simultaneously, assisting in the displacement of particulate matter from the surface (s) of the sensor(s), maximising the beam angle of an emitted signal, and increasing the collecting power of the sensor head 100 for the detection of the reflected signal intensity by the sensor(s).

The shell 110 of the sensor head 100 may be manufactured from a variety of materials including but not limited to: plastics such as polyvinyl chloride (PVC), polypropylene (PP), Poly(methyl methacrylate) (PMMA) and the like; natural or synthetic rubber; and metals such as iron, stainless steel, aluminium or brass. Other components of the sensor head 100, such as the fitting portion 140 and the conduit(s) 150, may be manufactured from the same material as the rest of the shell 110 or another material. Materials for manufacture may be selected in consideration of a number of parameters such as the range of temperatures which the sensor head 100 will be exposed to, the resonant frequencies of the materials in question, as well as strength, weight, durability, corrosion or rust resistance and the like. The components of the sensor head 100 may be formed according to a number of known processes such as 3D printing, injection moulding, bladder moulding, blow moulding, thermoforming, resin casting and the like; it is not intended to elaborate on these processes here.

Ideally the fluid is a gas. The gas may be one or a mixture of: oxygen, nitrogen, carbon dioxide, helium, methane or argon; a number of other gases which do not change state at the desired operating thermodynamic parameters of the present system are envisaged to be feasible alternatives. In the exemplary embodiment, the fluid is compressed air. In agricultural embodiments, biogas generated by livestock or by other means may be stored or routed to form the fluid supply. In alternative embodiments, the fluid may be a liquid. In further embodiments, the gas may be stored as a liquefied gas. In embodiments, the fluid supply may be any compressed fluid volume such as a gas canister.

The one or more sensors may include but are not limited to: a temperature sensor such as a thermistor, a humidity sensor, a sensor for measuring calorific value, a shock sensor, an accelerometer, a reed switch, RADAR, LIDAR, an acoustic sensor such as an ultrasonic sensor, a capacitive sensor, and optical sensors such as a lumen sensor, a 3D camera, a CCD, a CMOS device, an infrared sensor and the like.

Figure 2:
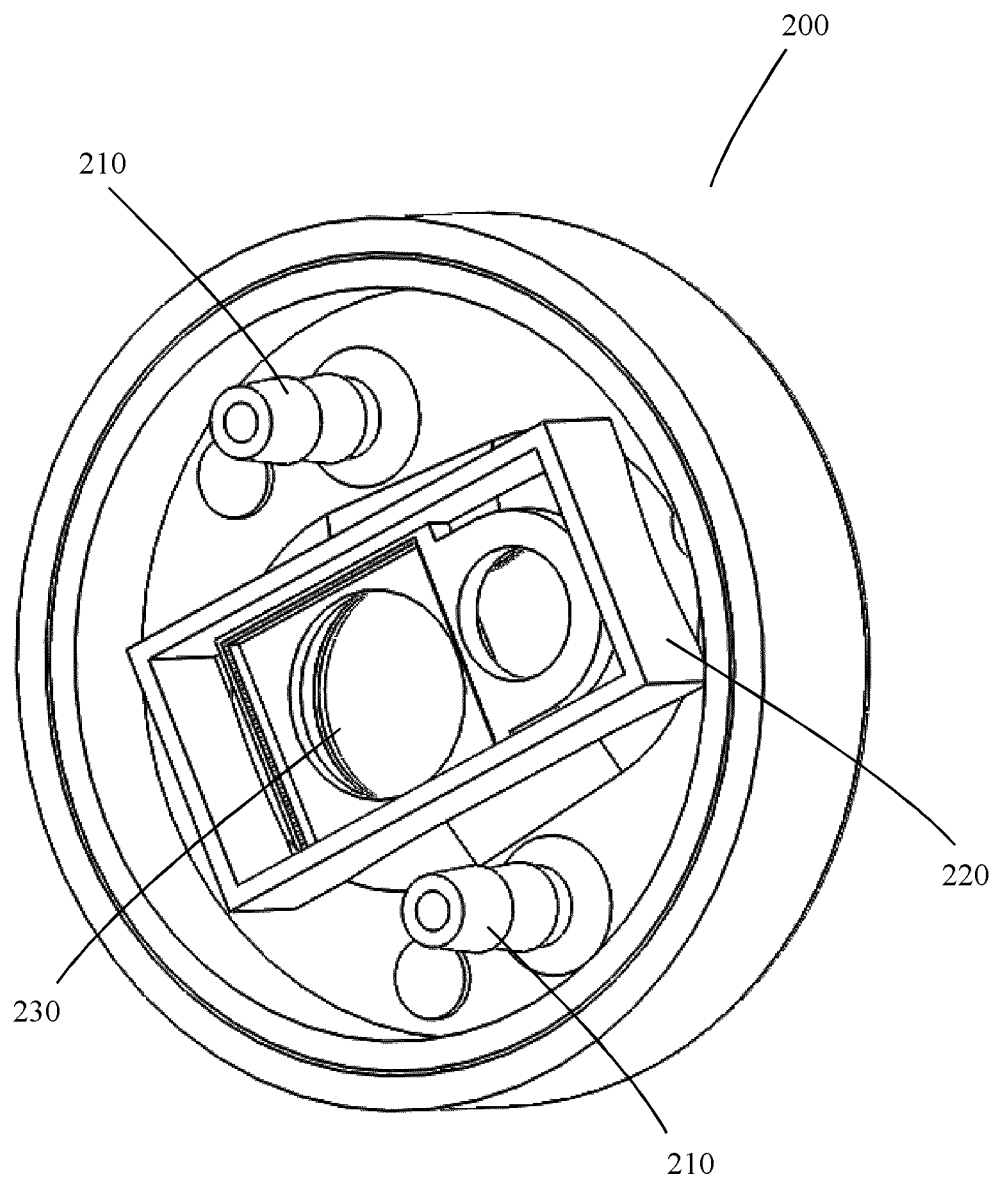
FIG. 2 is an illustration of an isometric view of a sensor head, according to an embodiment of the present disclosure.

FIG. 2 is an illustration of an alternative isometric view of the underneath of a sensor head 200, the same as that of the previous figure. It will be understood that elements of the embodiment of FIG. 2 refer to the same elements as that of FIG. 1, the only difference being that reference numerals are labelled 2xx rather than 1xx. Visible here are the conduits 210, the fitting portion 220 and the one or more apertures 230 through which the one or more sensors may "sense".

Figure 3:
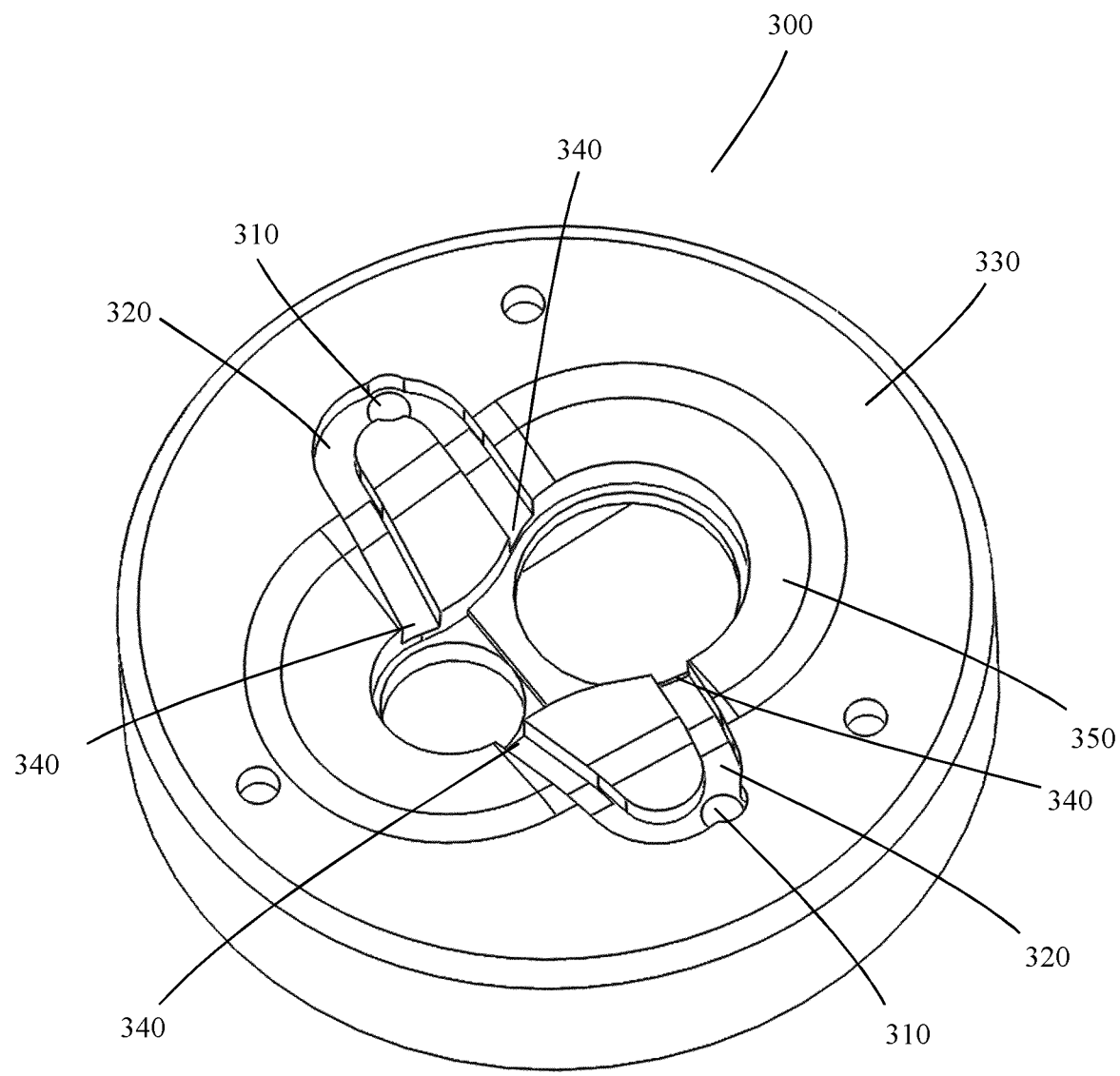
FIG. 3 is an illustration of an isometric view of a sensor head including a cut-away view of a portion of the sensor head, according to an embodiment of the present disclosure.

Referring now to FIG. 3, there is presented an isometric view of the top of a sensor head 300, the same as that of the previous Figures. In particular, there is illustrated a cut-away view of the volumes 310 for receiving the fluid from the conduits 150, and the channels 320 in communication with the volumes 310. Both the volumes 310 and the channels 320 are formed inside the shell 330 and are regularly out of view—their presentation in the present Figure is for purely demonstrative purposes. Also visible is the plurality of orifices 340 formed on the surround 350, which are in communication with the channels 320, for facilitating the distribution of the fluid from the channels 320 to the surface of one or more sensors. Preferably the position and number of the orifices 340 may be chosen to facilitate the generation of a vortex on the surface of the one or more sensors. Ideally the position and number of the orifices 340 may be chosen to generate a vortex which provides a force substantially normal to a tangential plane of the sensor surface(s), such that no particulate matter is blown in to a recess of any sensor. In the exemplary embodiment, an orifice may be disposed on the surround 350 such as to be aligned with both extreme sides of each sensor. The orifices 340 may define one or more of: a circle, an ellipse, a square, a rectangle, or a number of other geometries. A flap (not shown) may be disposed over each orifice 340 to prevent the ingress of particulate matter in to the channels 320 whilst not altogether obstructing the egress of the fluid out of the orifices 340 from the channels 330 and on to the surface of the one or more sensors. Alternatively a mesh (not shown) may be dimensioned to fit each orifice 340 and prevent the ingress of particulate matter in to the channels 320 whilst not altogether obstructing the egress of the fluid out of the orifices 340 from the channels 330 and on to the surface of the one or more sensors.

Figure 4:
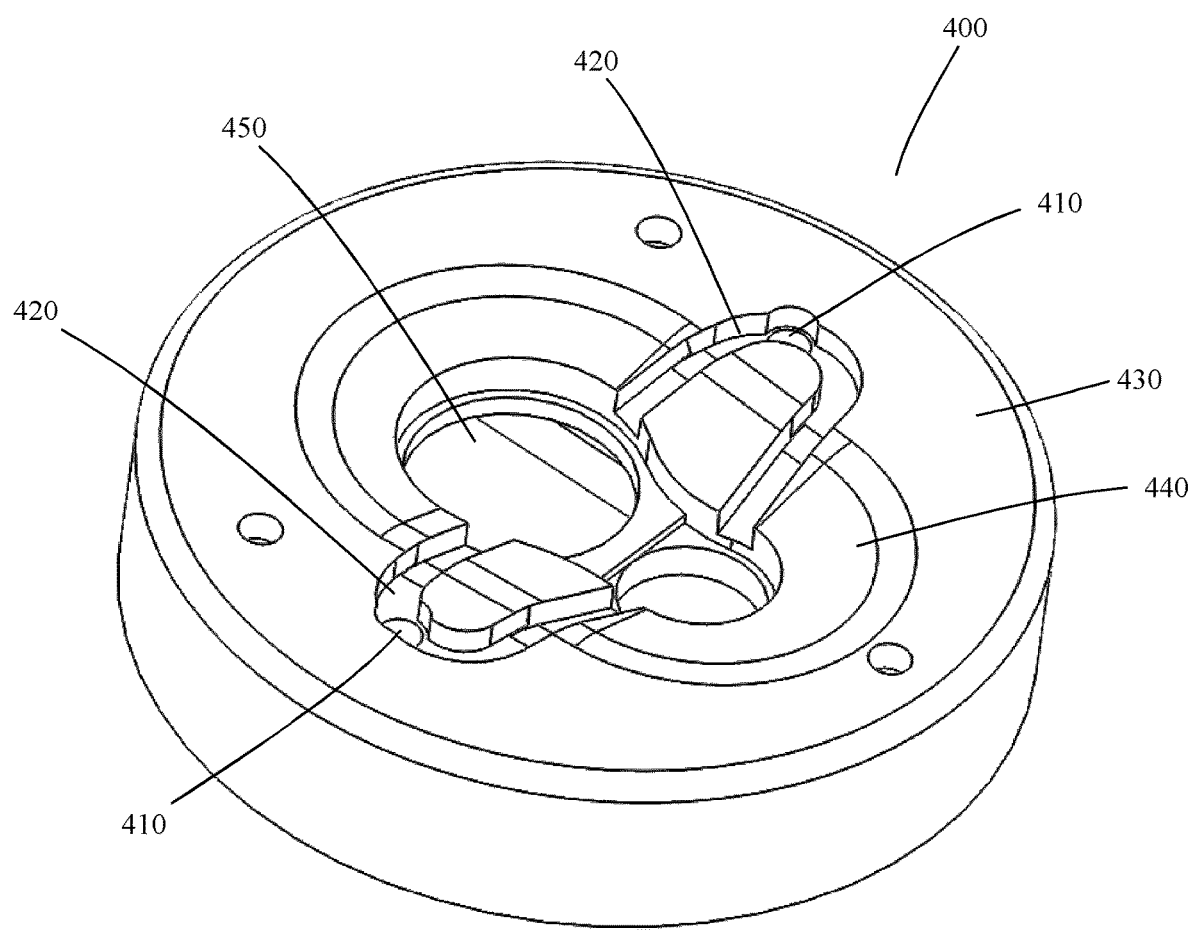
FIG. 4 is an illustration of an isometric view of a sensor head including a cut-away view of a portion of the sensor head, according to an embodiment of the present disclosure.

Referring now to FIG. 4, there is illustrated an alternative isometric view of the top of the sensor head 400 of any previous figure. Visible here are the volumes 410 which are in communication with the channels 420. Also visible are the shell 430, the surround 440 which the shell 430 defines and the one or more apertures 450 through which the one or more sensors may "sense". In the exemplary embodiment, the sensor head 400 comprises two apertures 450. The apertures 450 may define different geometries than each other or the same geometries as each other. In certain embodiments, the apertures 450 are both circular. In some embodiments the apertures 450 have the same diameter. In other embodiments, the apertures 450 have different diameters.

Figure 5:
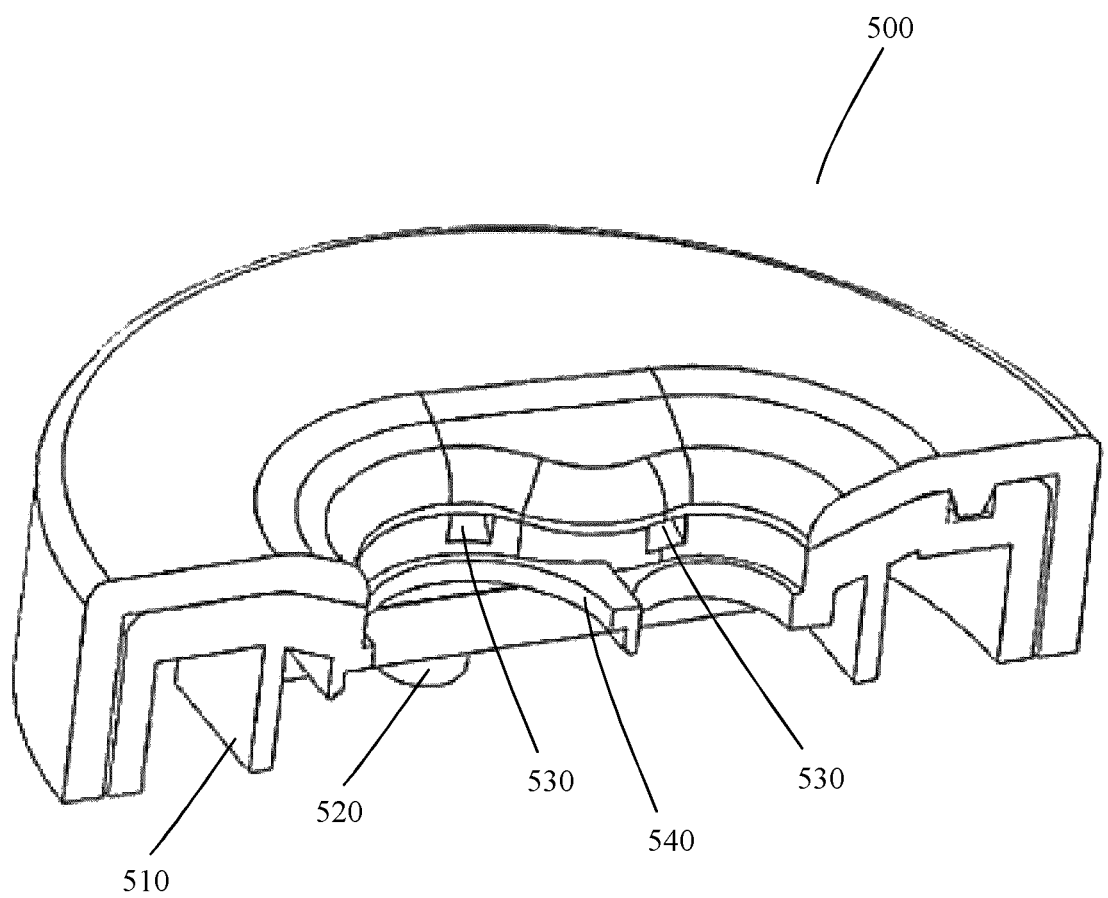
FIG. 5 is a cross-sectional view of a sensor head, according to an embodiment of the present disclosure.

FIG. 5 is an illustration of a cross-section of a sensor head 500, the same as that of any previous Figure. Ideally, the fitting portion 510 of the sensor head 500 is dimensioned to provide a snug fit for the neck 510. Visible also is one of the conduits 520 which is in communication with one of the volumes (not presented), as well as the orifices 530 formed at the ends of the channels (not presented), and part of the apertures 540 which accommodate the sensor(s). In the exemplary embodiment, the outer surfaces of the conduits 520 have disposed on them a plurality of ribs (not shown). Preferably, the pointed ends of the ribs are directed towards the top surface of the sensor head 500. In embodiments where a detachable tube, such as an acrylic tube, is connected to the conduit(s) 520 for directing the fluid from the fluid supply to the conduit(s) 520, the ribs provide a resistive force against any tendency of the detachable tube to disconnect from the conduit(s) 520 causing spillage and temporary loss of operation of the sensor head 500 proper. Such a tendency of the detachable tube to disconnect from the conduit(s) 520 may be caused, for example, by turbulent fluid motion in the interior volume defined by the tube which causes the tube to oscillate.

Figure 6A:
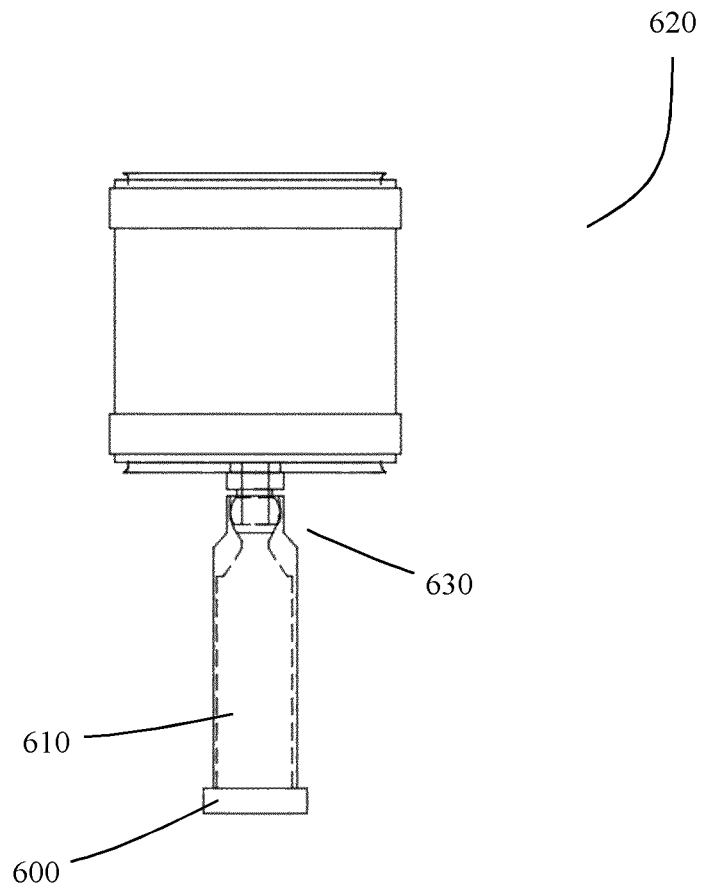
FIG. 6a is an illustration of a cross-sectional view of a sensor system including a neck comprising a pivot mechanism; according to an embodiment of the present disclosure.
Figure 6B:
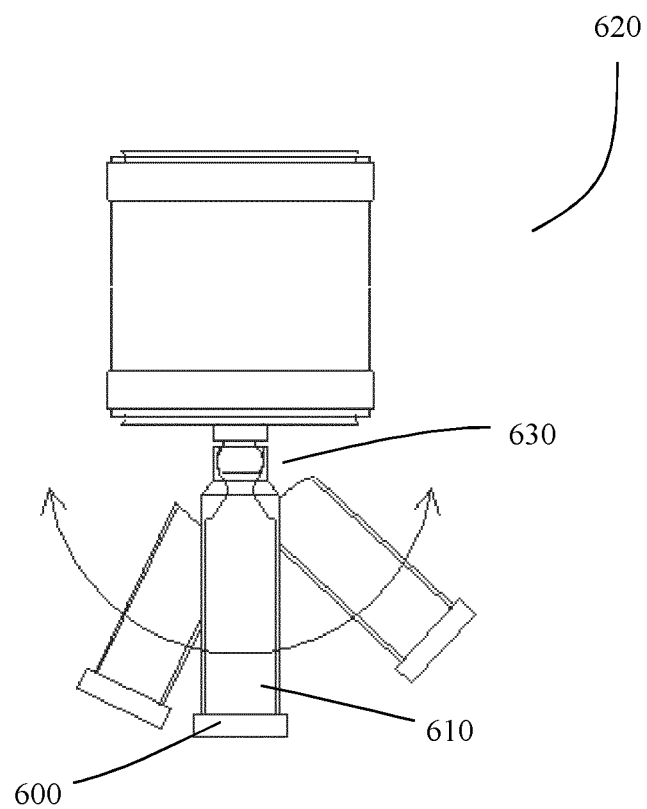
FIG. 6b is an illustration of possible angular reorientations of a pivot mechanism of a sensor system; according to an embodiment of the present disclosure.

Referring now to FIG. 6a, there is illustrated the sensor head 600 retrofitted to the neck 610 of a sensor system 620. A pivot mechanism 630 is positioned diametrically opposite the one or more sensors on the neck 610 of the sensor system 620, facilitating reorientation of the sensor head 600. In the exemplary embodiment, the pivot mechanism 630 may be a ball joint. FIG. 6b illustrates the functionality of the pivot mechanism 630, in the present embodiment the ball joint, to be reoriented about an axis. One notable advantage of using a pivot mechanism such as the ball joint is that the sensor head 600 and sensor system 620 need not be positioned on the ceiling, or a specific point on the ceiling, of the environment in which the sensor system and sensor head 600 are situated. Rather, the sensor head 600 and sensor system 620 may be positioned at any point in the environment deemed appropriate by the user and the direction that the sensor head 600 and sensor system 620 face can be adjusted about an axis using the pivot mechanism 630. The phrase 'any point' includes for example ceilings, vertical walls and inclined surfaces of the environment. In embodiments where it is considered desirable to determine the topology of the surfaces of the environment, for example the surface topology of grain in a silo, reflected waves of light or sound are commonly used as a means to measure. It will be understood by the skilled person that the reflection quality of the waves returning to a sensor at least in part defines the quality of the reading of that sensor. Being able to more freely position and adjust the orientation of the sensor head 600 and sensor system therefore provides a user with greater freedom in optimising the beam angle of the emitted signal which will be reflected and ideally return to the sensor(s). The user might choose to adjust the sensor head 100 and sensor system to face bottom of the environment, or the user might choose some other point of strategic value in the context of their work. In embodiments where the emitting source emits radio waves, received signal strength indicator (RSSI) may be used a metric for determining the quality of a reflected signal intensity and for parametrising a predefined threshold fraction of measured reflected signal intensity. RSSI would not be used as a metric for determining if particulate matter or other debris has accumulated on the surface(s) of the sensor(s), but might used in determining the topology of the surface of environment or for detecting anomalies in the environment.

In the exemplary embodiment, the sensor system may additionally comprise an oscillation mechanism (not shown) connected to the shell 110, for actuating oscillating motion of the sensor head 600. In some embodiments, the oscillation mechanism may be configured to have an adjustable frequency. The oscillation mechanism causing the sensor head 600 to oscillate further assists in displacing particulate matter or any other debris from the surface of the one or more sensors. In some embodiments, the one or more processors of the controller may be further configured to transmit a signal to the oscillation mechanism to initiate oscillating motion of the sensor head 600 in response to the one or more sensors detecting when a predefined threshold fraction of a measured light intensity has been surpassed. Preferably, the oscillation mechanism may operate simultaneously with the jet stream of the fluid being directed to the surface of the one or more sensors to remove particulate matter or any other debris. Alternatively, the oscillation mechanism may operate separate from the jet stream of the fluid being directed to the surface of the one or more sensors.

Figure 7:
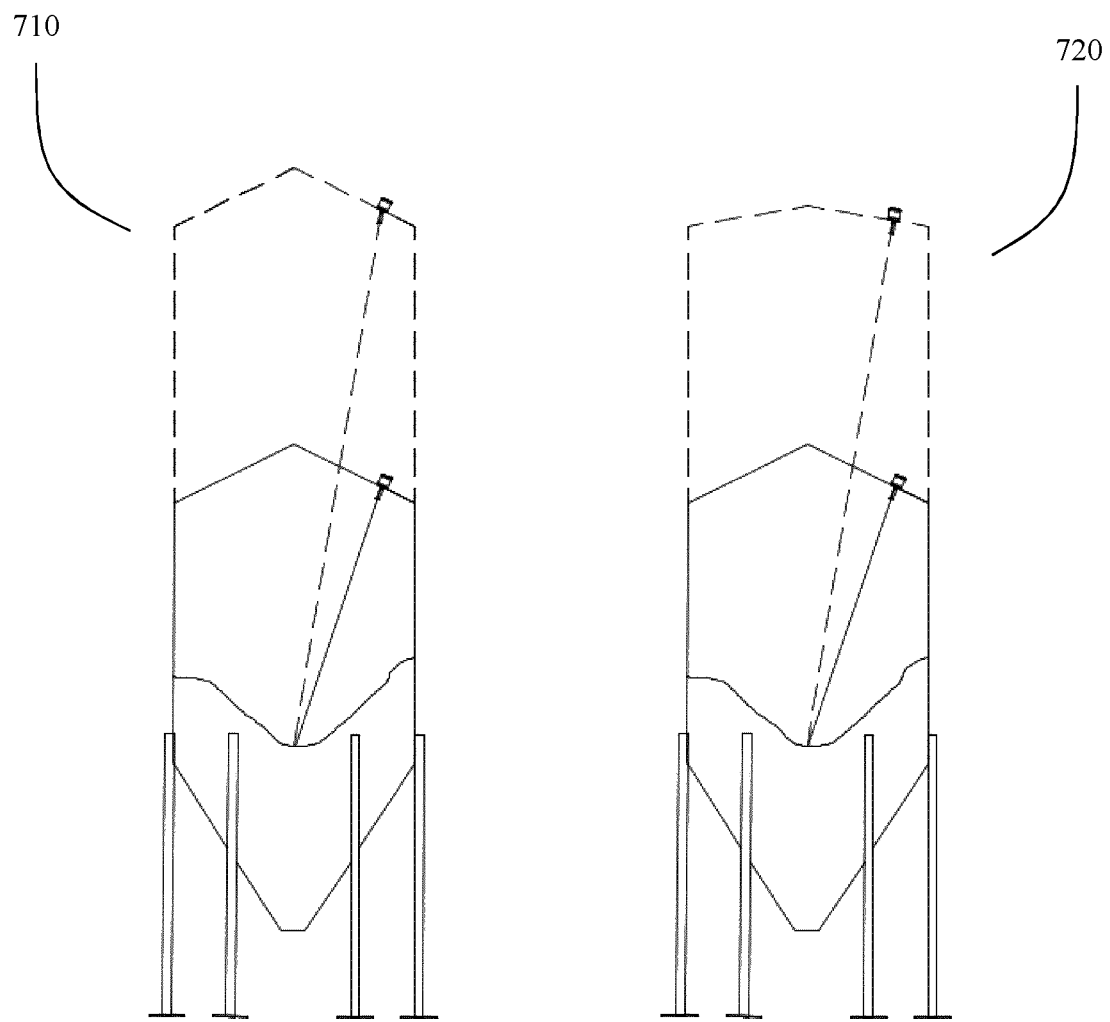
FIG. 7 is an illustration of two possible geometries of silos in which a sensor head may be positioned; according to embodiments of the present disclosure.

FIG. 7 is an illustration of two possible geometries 710; 720 of silos in which the sensor head 100 may be positioned. The degrees of freedom provided by the pivot mechanism 630 facilitate greater flexibility in the positioning of the sensor head 100 in a silo or another storage facility such as a warehouse and the like, as the mechanism allows the sensor(s) and the sensor head to be adjusted to face the direction with the optimal beam angle.

Figure 8:
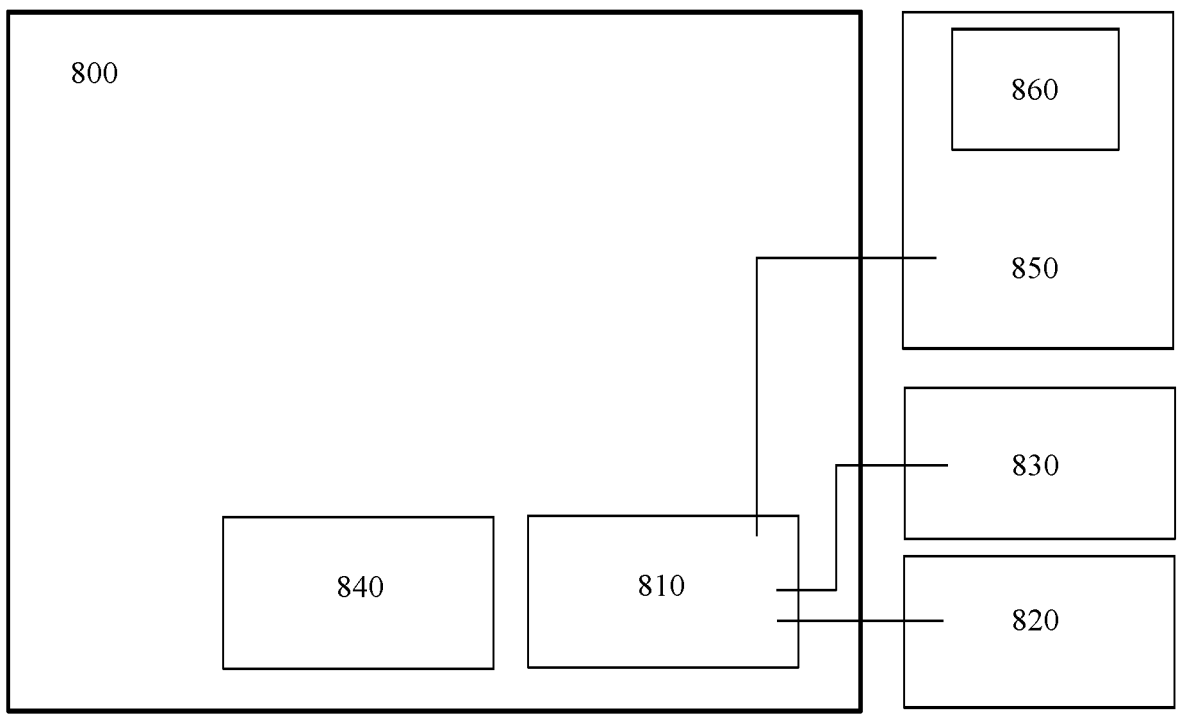
FIG. 8 is an illustration of a configuration of a controller for use with a sensor head, according to an embodiment of the present disclosure.

Referring now to FIG. 8, there is presented a block diagram illustrating a configuration of a controller 800, the same as that of the previous Figures, for use with the sensor head 100. In the exemplary embodiment the controller 800 may comprise one or more processors 810 operationally associated with one or both of the one or more sensors 820 and the fluid supply 830; and one or more memory units 840. Preferably, at least one of the one or more sensors 820 may be configured to transmit a signal when it has detected that a predefined threshold fraction of a measured light intensity has been surpassed. In the exemplary embodiment, to detect when the predefined threshold fraction of a measure light intensity has been surpassed, the sensor(s) 820 may be configured to measure the fraction of laser light reflected back to the sensor(s) 820 from the surfaces of the environment in which the sensor head 100 and sensor system are positioned. In such an embodiment, the sensor(s) 820 may be initialised/calibrated to store data corresponding to a set fraction of reflected laser light intensity which logically corresponds to 'reflected signal OK' or the like, meaning the sensor 820 surface(s) is/are clean. If, for example, the measured reflected light intensity drops below the predefined threshold, an error event may be triggered which logically corresponds to 'reflected signal is too weak, strengthen measured target reflection'—that is, too much particulate matter or other debris has/have accumulated on the surface(s) of the sensor(s) 820 and cleaning is now required to restore the measured reflected light intensity to a value above the predefined threshold fraction. In such an error event, the one or more sensors 820 may transmit the signal. Ideally, the one or more processors 810 may be configured to receive the signal transmitted by the sensor(s) 820. In response to the signal received from the sensor(s) 820, the one or more processors 810 may control the fluid supply 830 to initiate the flow of fluid to the conduit(s) 150. The fluid will then pass through the conduit(s) 150, through the volume(s) 210 and then through the channels 220, finally being directed to the surface of the sensor(s) 820 via the orifices 240, where particulate matter and/or debris may be displaced from the surface of the sensor(s) 820.

Advantageously, the one or more processors 810 may be further configured to transmit a signal to the oscillation mechanism to initiate oscillating motion of the sensor head 200 in response to the signal received from the one or more sensors 820 when the predefined threshold fraction of a measured light intensity has been surpassed. The one or more processors 810 may actuate oscillation of the sensor head 200 via the oscillation mechanism either simultaneously with the control of the fluid supply 830 to direct the fluid to the surface of the sensor(s) 820, or in isolation of the control of the fluid supply 830 to direct fluid to the surface of the sensor(s) 820. The frequency of oscillations may be selected in consideration of a number of parameters including but not limited to the natural frequency of one or more components of the sensor head 100 or the sensor system, or the natural frequency of the particulate matter or debris disposed on the surface of the sensor(s) 920.

The sensor(s) 820 will continuously take measurements of the reflected light intensity and, if after the first cleaning the measured reflected light intensity remains below the predefined threshold fraction, the cleaning process may repeat until the measured reflected light intensity is greater than the predefined threshold fraction. Preferably, any protocols for responding to error events and predefined parameters such as the predefined threshold fraction of the measured light intensity may be stored on the one or more memory units 840. When the one or more processors 810 receive the signal transmitted by the sensor(s) 820, predefined response protocol(s) may be retrieved from the one or more memory units 840.

This process of cleaning the surface(s) of sensor(s) 920 which are positioned in a dusty environment is entirely automated and requires no user input such as physically accessing the sensor(s) inside the environment or monitoring measured signal intensities. Consequently, the present invention will significantly reduce the time and effort expended by workers in industry otherwise having to manually access and clean sensors to ensure that their data relating to bulk material storage is being recorded and is accurate.

In some embodiments, the one or more processors 810 may be further operationally associated with a remote control system 850. Preferably, the one or more processors 810 may be configured to transmit information to the remote control system 850 including but not limited to one or more intensity profiles measured by the one or more sensors 820 and a notification when a predefined threshold fraction of a measured signal intensity has been surpassed. Ideally, the remote control system 850 comprises a graphical user interface (GUI) 860 for displaying information including but not limited to the one or more intensity profiles measured by the one or more sensors 820 and a notification when a predefined threshold fraction of a measured light intensity has been surpassed. Advantageously, the remote control system 850 may be configured to selectively control the fluid supply 830 to initiate the flow of fluid from the fluid supply 830 to the at least one conduit 150, in response to a user input. The one or more processors 810 may be configured to transmit information to the remote control system 850 including but not limited to one or more intensity profiles measured by the one or more sensors 820 and a notification when a predefined threshold fraction of the measured signal intensity has been surpassed. Ideally, the remote control system 850 may further comprise one or more processors and one or more memory units, in addition to the GUI 860. The remote control system may be communicatively coupled with the one or more processors 810 of the controller 800 either wirelessly or through wired channels. Advantageously, the remote control system 850 may be configured to detect when an error or malfunction has occurred in the controller 800, the sensor(s) 820 and other components such as the oscillation mechanism, and may be able to facilitate manual override of the same accordingly.

Preferably, the sensor(s) 820 may be configured to transmit a signal in response to a variety of other predefined threshold parameters being surpassed—that is, other error events. Predefined threshold parameters may include but are not limited to: a maximum or minimum temperature; a maximum measured light intensity; a maximum or minimum input voltage; a maximum or minimum measurement range of a target and a maximum or minimum oscillation frequency. As such, a number of additional protocols for responding to the additional error events and malfunctions may be stored on the one or more memory units 840 and accessed by the one or more processors 810 when a signal from the sensor(s) 820 is received by the one or more processors 810. In embodiments, said protocols may also be stored in the memory unit(s) of the remote control system 850. Additional protocols relating to detection of errors or malfunctions in the controller 800, the sensor(s) 820 and other components such as the oscillation mechanism, may be stored in the memory units(s) of the remote control system 850.

In-use: The following is a single illustrative example of a use of the sensor head 100 to clearly communicate the functional operation of the sensor head 100; other in-use eventualities will be understood to be contemplated in view of the foregoing. The sensor head 100 may be retrofitted to the neck of a sensor system 620, the neck having at one end the sensor(s) 820 and at the opposite end possible the pivot mechanism 630. The sensor system may then be positioned in the environment where it shall be used, such as a silo 710; 720, and orientated to optimise the beam angle using the pivot mechanism 630. The sensor(s) may record data according to desired protocols, whether that be continuously or in intervals. If the sensor(s) 820 detect that the measured signal intensity has dropped below a predefined threshold fraction, a signal will be transmitted to the processor(s) 810 of the controller 800. In response to the signal received from the sensor(s) 820, the processor(s) transmit a signal to the fluid supply 830 to selectively control the fluid supply 830 to initiate the flow of fluid. The processor(s) 810 may also transmit a signal to the oscillating mechanism to generate oscillating motion to assist in displacing any particulate matter from the surface(s) of the sensor(s) 820. The fluid will flow from the fluid supply 830 to the conduit(s) 150, then to the volume(s) 310 in communication with the conduit(s) 150, then to the channels 320 in communication with the volume(s). At the interface between the volume(s) 310 and the channels 320, the cross-sectional area of the volume(s) 310 being greater than the cross-sectional area of each of the channel(s) 320 causes an increase in the pressure of the fluid as it passes from the volume(s) 310 to the channels 320. Passing through the channels 320, the fluid reaches the orifices 340 and is consequently directed to the surface(s) of the sensor(s) 820, displacing any particulate matter from the surface(s) of the sensor(s) 820. The sensor(s) 820 will capture data pertaining to the measured signal intensity and, if it is above the predefined threshold fraction, either a signal indicating 'measured signal intensity OK' will be transmitted to the processor(s) 810 or no signal will be transmitted at all in a predefined time period indicating that cleaning is no longer required. The user may at any time observe data captured by the sensor(s) 820 and manually actuate this in-use process to occur, via a remote control system 850.

In a further advantageous embodiment of the present disclosure, a pressure vessel (not pictured) may be operably connected to the conduit(s) 150. The pressure vessel may comprise any desired volume or geometry as appropriate. In the exemplary embodiment the pressure vessel comprises a pressure release valve configured to be openable when the pressure in the pressure vessel reaches a predefined value, to facilitate the flow of fluid to the surface(s) of the sensor(s) 820 at a desired release pressure. For example, the pressure vessel may be allowed to "charge" with air until a predefined pressure in the pressure is reached, the predefined pressure being selected such that air is provided to the conduit(s) 150 at a desired pressure. It will be understood that the pressure release valve may be in communication with processor(s) of a controller such as the controller 800 of FIG. 8. For example, when the measured signal intensity drops below a predefined threshold value of signal intensity, the processor (s) may send a signal to the pressure release valve indicating that cleaning is required. If the pressure in the pressure vessel has not yet reached the predefined value, the pressure vessel will continue charging, and once charging is complete (i.e. the pressure has reached the predefined value) then the pressure release valve will open and facilitate flow of fluid to the conduit(s) 150, initiating cleaning.

Advantageously, this configuration does not require connection of a pre-pressurised source of fluid (e.g. a gas canister) which can be purchased from commercial vendors, reducing costs significantly. The pressure vessel and any associated valves may be manufactured by any conventional means, such as 3D printing. What is more, the pressure vessel and any associated valves may be formed integrally as part of the sensor head or as separate components suitably configured for attachment as desired. The air from the pressure vessel can also be used to force open other valves such as a water valve to add an additional fluid to the air at the exact time of cleaning of sensors.

The ability to use the pressure vessel and pressure release valve to selectively adjust the desired pressure of fluid release to the conduit(s) 150 means that users can respond dynamically to situational problems as they arise. For example, the predefined pressure (and thus the desired release pressure of fluid from the pressure vessel) may be adjusted based on measured signal intensity. For example, if measured reflected signal intensity is 80%, then this may indicate that only a small amount of debris is present on the surface(s) of the sensor(s) and thus the predefined pressure may be set to a first value which corresponds to a release pressure sufficient to remove said debris. If measured reflected signal intensity is 30%, then this may indicate that only a larger amount of debris is present on the surface(s) of the sensor(s) and thus the predefined pressure may be set to a different value which produces a pressure greater than the first and which is sufficient to remove said larger volume of debris. This dynamic adjustment of the desired release pressure can be achieved by communication of processors on-board the sensor head which are in communication with the pressure release valve and the sensor(s). For example, at the same time as sending a signal to the pressure release valve indicating that cleaning is required, a processor may send a signal to the pressure release valve indicating the pressure that is required for cleaning based on the measured signal intensity. In response, the pressure release valve will not open until said pressure is achieved in the pressure vessel. It will be understood that a number of mathematical relations between the predefined pressure and the measured signal intensity could be implemented, whether they be in a discrete, tabulated form or a continuous relationship such as but not limited to an inverse proportionality relationship such as $$I \propto \frac{k}{p}$$

where I is measured signal intensity, p is pressure and k is a constant. Memory on board the controller 800 or located remotely may store such instructions.

As noted previously, the exemplary sensor head is not envisaged by the inventor to be confined to use in silos. Where the sensor head is implemented in a vehicle setting, the fluid may comprise air incoming against the vehicle. In embodiments where the fluid comprises air incoming against the vehicle, the pressure vessel may further comprise a non-return valve to capture incoming air. In addition to "charging" the pressure vessel to a predefined pressure using incoming air, the sensor head may be configured with at least one conduit 150 which directs incoming air directly to the surface(s) of the sensor(s) via orifice(s) 340 without passing through the pressure vessel to facilitate a constant stream of air to the surface(s) of the sensor(s) whilst the vehicle is moving. Advantageously, this may provide an air blanket over the surface(s) of the sensor(s), reducing the likelihood of debris sticking to the surface(s) of the sensor(s). The air blanket constantly passes over the sensor head in a format that enables any oncoming dust or dirt to be swept to away before coming into contact with the sensor head. In embodiments where the sensor head is implemented in a vehicular setting, the sensor head and its component parts may be suitably configured in to the body of the vehicle in question. As an example, where the sensor head is located at the tail end of a car, the pressure vessel and/or conduit(s) 150 may be connected with one or more apertures located at the front end of the car which capture incoming air whilst the car is moving. When the sensor head is implemented in another setting such as a silo or a warehouse, the pressure vessel may be situated within the neck 620 or separately.

In various embodiments, a secondary fluid supply may be operably connected to a conduit(s) 150 of the sensor head. For example, should the pressure release valve fail, processor(s) may direct a signal to the secondary fluid supply to initiate the flow of fluid so that cleaning may proceed. The predefined pressure may be pre-set by a user at a user device, or may be set to a default, manufacturer-set value when the sensor head system is initialised.

The invention is not limited to the embodiment(s) described herein but can be amended or modified without departing from the scope of the present invention.

It will be understood that while exemplary features of an apparatus and a system for facilitating cleaning of one or more sensors have been described that such an arrangement is not to be construed as limiting the invention to such features. The method for facilitating cleaning of the one or more sensors may be implemented in software, firmware, hardware, or a combination thereof. In one mode, the method is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. The steps of the method may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the method for controlling aspects of the present invention. The processor(s) is a hardware device for executing software, particularly software stored in memory. Processor(s) can be any custom made or commercially available processor, a primary processing unit (CPU), an auxiliary processor among several processors associated with a computer, a semiconductor based microprocessor (in the form of a microchip or chip set), a macro-processor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present disclosure may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. Any process descriptions or blocks in the Figures, should be understood as representing modules, segments, or portions of code which include one or more executable instructions for implementing specific logical functions or steps in the process, as would be understood by those having ordinary skill in the art.

The above detailed description of embodiments of the disclosure is not intended to be exhaustive nor to limit the disclosure to the exact form disclosed. While specific examples for the disclosure are described above for illustrative purposes, those skilled in the relevant art will recognize various modifications are possible within the scope of the disclosure. For example, while processes and blocks have been demonstrated in a particular order, different implementations may perform routines or employ systems having blocks, in an alternate order, and some processes or blocks may be deleted, supplemented, added, moved, separated, combined, and/or modified to provide different combinations or sub-combinations. Each of these processes or blocks may be implemented in a variety of alternate ways. Also, while processes or blocks are at times shown as being performed in sequence, these processes or blocks may instead be performed or implemented in parallel or may be performed at different times. The results of processes or blocks may be also held in a non-persistent store as a method of increasing throughput and reducing processing requirements.

What is claimed is:

1. A sensor head configured for facilitating cleaning a surface of one or more sensors, the sensor head comprising:

a shell defining a surround for accommodating the one or more sensors therein, said shell further comprising:

at least one conduit for receiving a fluid to facilitate the cleaning of the surface of the one or more sensors, said at least one conduit being in communication with a volume, a plurality of channels, at least one of the plurality of channels being in communication with the volume, said channels configured for directing the flow of fluid to a vicinity of the surround; and each of said plurality of channels being in communication with an orifice formed on the surround for facilitating the distribution of the fluid to the surface of the one or more sensors; wherein the cross-sectional area of the channel is different than the cross-sectional area of the volume to control the pressure of the fluid directed to the orifice;

wherein the position and number of the orifices are chosen to facilitate the generation of a vortex on the surface of the one or more sensors.

2. The sensor head of claim 1, wherein the fluid comprises air incoming against a moving vehicle, and wherein the pressure vessel further comprises a non-return valve.

3. The sensor head of claim 2, further comprising at least one additional conduit configured to direct incoming air to the surface of the one or more sensors without passing through the pressure vessel to facilitate a constant stream of air to the surface of the one or more sensors whilst the vehicle is moving.

4. The sensor head of claim 1, wherein the cross-sectional area of the channel is less than the cross-sectional area of the volume to increase the pressure of the fluid directed to the orifices.

5. The sensor head of claim 1, further comprising an oscillation mechanism connected to the shell, for actuating oscillating motion of the sensor head; and/or the oscillation mechanism being configured to have an adjustable frequency.

6. The sensor head of claim 1, wherein a perimeter of the surround defined by the shell is bevelled.

7. A controller for use with the sensor head of claim 1, comprising:

a processor operationally associated with one or both of the one or more sensors and the pressure release valve of the pressure vessel; and memory.

8. The controller of claim 7, wherein at least one of the one or more sensors is configured for detecting when a predefined threshold fraction of a measured signal intensity has been surpassed, and wherein at least one of the one or more sensors is configured to transmit a signal when it has detected that a predefined threshold fraction of a measured signal intensity has been surpassed.

9. The controller of claim 8, the processor being configured for receiving the signal generated by the one or more sensors in response to a predefined threshold fraction of a measured signal intensity having been surpassed, wherein the processor is further configured to direct a signal to the pressure release valve in response to receiving the signal from the one or more sensors.

10. The controller of claim 9, the pressure release valve being configured to open and initiate the flow of fluid to the conduit in response to the signal received from the processor when the predefined threshold fraction of the measured signal intensity has been surpassed.

11. The controller of claim 10, wherein the pressure release valve is configured to open only once the pressure in the pressure vessel has reached the predefined value.

12. The controller of claim 11, the memory containing instructions executable by the processor to adjust the predefined pressure at which the pressure release valve should be openable based on the measured signal intensity.

13. The controller of claim 9, the processor being further configured to transmit a signal to the oscillation mechanism to initiate oscillating motion of the sensor head in response to the signal received from the one or more sensors when a predefined threshold fraction of a measured signal intensity has been surpassed.

14. The controller of any one of claim 9, the processor being further operationally associated with a remote control system, the remote control system being configured to selectively control the fluid supply to initiate the flow of fluid from the fluid supply to the conduit, in response to a user input.

15. The controller of claim 14, wherein the remote control system comprises a user display interface for displaying information including but not limited to the one or more intensity profiles measured by the one or more sensors and a notification when a predefined threshold fraction of a measured signal intensity has been surpassed.

* * * * *